US010057822B2

(12) United States Patent
Wang et al.

(10) Patent No.: US 10,057,822 B2
(45) Date of Patent: Aug. 21, 2018

(54) METHOD AND APPARATUS FOR HANDING OVER DEVICE

(75) Inventors: Ying Wang, Beijing (CN); Jiamin Liu, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 13/980,652

(22) PCT Filed: Jan. 13, 2012

(86) PCT No.: PCT/CN2012/070343
§ 371 (c)(1),
(2), (4) Date: Oct. 29, 2013

(87) PCT Pub. No.: WO2012/097709
PCT Pub. Date: Jul. 26, 2012

(65) Prior Publication Data
US 2014/0050138 A1  Feb. 20, 2014

(30) Foreign Application Priority Data
Jan. 19, 2011 (CN) .......................... 2011 1 0021682

(51) Int. Cl.
*H04B 7/00* (2006.01)
*H04W 36/00* (2009.01)
*H04W 4/06* (2009.01)

(52) U.S. Cl.
CPC ......... *H04W 36/0083* (2013.01); *H04W 4/06* (2013.01)

(58) Field of Classification Search
CPC ......... H04W 36/0005; H04W 36/0061; H04W 36/16; H04W 36/18
(Continued)

(56) References Cited

U.S. PATENT DOCUMENTS 7,437,178 B2 * 10/2008 Jeong ................ H04W 36/0055
370/331
8,396,477 B2 * 3/2013 Kanazawa et al. ........... 455/436
(Continued)

FOREIGN PATENT DOCUMENTS

| CN | 1833380 A | 9/2006 |
|---|---|---|
| CN | 101754392 A | 6/2010 |
| CN | 102075867 A | 5/2011 |

OTHER PUBLICATIONS

International Search Report of PCT/CN2012/070343, dated Apr. 19, 2012.

*Primary Examiner* — Dmitry H Levitan
(74) *Attorney, Agent, or Firm* — Oliff PLC (57) ABSTRACT

Disclosed in the present invention are a method and apparatus for handing over device, and belongs to the field of mobile communication. The method comprises: obtaining the Multimedia Broadcast Multicast Service (MBMS) service reception information of the device; according to the MBMS service reception information, selecting a target cell supporting the MBMS service for the device; handing over the device to the target cell. The apparatus comprises: an acquiring module, for obtaining the MBMS service reception information of the device; a selection module, for selecting a target cell supporting the MBMS service for the device according to the MBMS service reception information; a handing over module, for handing over the device to the target cell. By the implementation of the technical solution that selecting a target cell supporting the MBMS service for the device according to the MBMS service reception information, and switching the device to the target cell, the present invention guarantees the continuity of the MBMS service during the handover process of the device.

14 Claims, 4 Drawing Sheets

(58) Field of Classification Search
USPC ................. 370/310, 328, 329, 331; 455/422, 455/436–442
See application file for complete search history.

(56) References Cited

U.S. PATENT DOCUMENTS

| | | | |
|---|---|---|---|
| 8,553,631 B2* | 10/2013 | Oprescu-Surcobe | H04L 65/00 370/329 |
| 8,861,419 B2* | 10/2014 | Korus | H04W 4/06 370/312 |
| 8,908,713 B2* | 12/2014 | Liu et al. | 370/437 |
| 2004/0147266 A1* | 7/2004 | Hwang | H04W 72/005 455/445 |
| 2005/0041608 A1 | 2/2005 | Jeong et al. | |
| 2006/0154627 A1* | 7/2006 | Wang et al. | 455/130 |
| 2006/0171355 A1* | 8/2006 | Kwak et al. | 370/329 |
| 2008/0273503 A1* | 11/2008 | Lee et al. | 370/336 |
| 2010/0113030 A1 | 5/2010 | Kanazawa et al. | |
| 2011/0039551 A1* | 2/2011 | Tsuboi et al. | 455/424 |
| 2011/0305183 A1* | 12/2011 | Hsu et al. | 370/312 |
| 2014/0050138 A1 | 2/2014 | Wang et al. | |

\* cited by examiner

METHOD AND APPARATUS FOR HANDING OVER DEVICE

This application is the National Stage of PCT/CN2012/070343 filed on Jan. 13, 2012, which claims priority under 35 U.S.C. § 119 of Chinese Application No. CN 201110021682.0 filed on Jan. 19, 2011, the disclosures of which are incorporated by reference. The international application under PCT article 21(2) was not published in English.

FIELD OF THE PRESENT INVENTION

The present invention relates to the field of mobile communication, in particular to the method and apparatus for handing over device.

BACKGROUND OF THE PRESENT INVENTION

Figure 1:
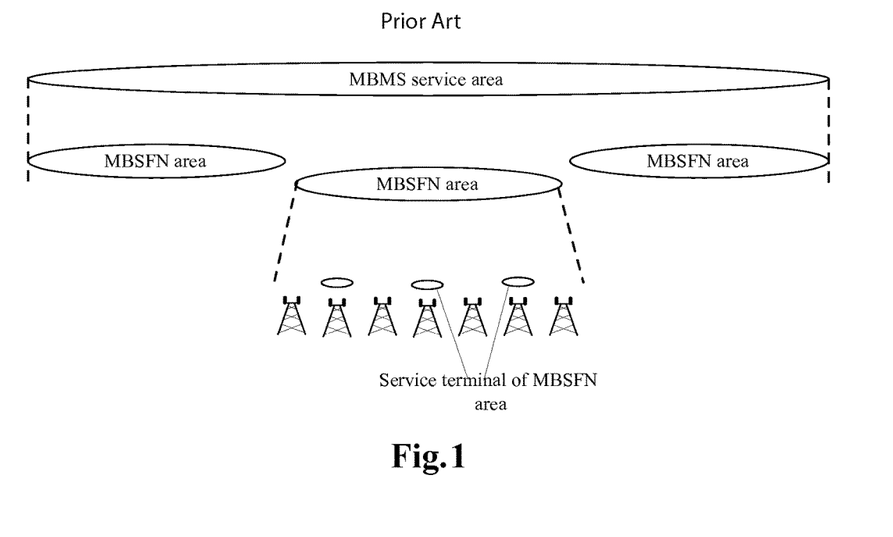
FIG. 1 is the relation diagram of MBMS service area and MBSFN synchronization area provided in the Prior Art.

MBMS (Multimedia Broadcast/Multicast Service) is used to provide Multimedia Broadcast/Multicast Service (MBMS) for users in wireless cell. During multi-cell transmission, such MBMS service shall support MBSFN (Multimedia Broadcast Single Frequency Network) transmission mode. Refer to FIG. 1 which shows the relations between MBMS Service Area and MBSFN synchronization Area. MBMS Service Area comprises of one or several service identification(s), each of which is mapped to one or several MBSFN area(s).

When the UE (User Equipment) receiving MBMS service moves in various MBSFN Areas or moves to the boundary within the same MBSFN area, source base station may perform area handing over on UE.

Currently, source base station mainly selects a cell with better signal quality from measurement report of UE, and then hands over the UE onto the cell.

The aforementioned handing over process may lead to MBMS service interruption of UE. For example, according to measurement report of UE, the target cell of source base station may be cell 2 or cell 3, but supposing that cell 2 supports MBMS service while cell 3 does not, source base station may hand over UE to cell 3, thus leading to MBMS service interruption of UE.

SUMMARY OF THE PRESENT INVENTION

To solve the above technical problems and guarantee MBMS service continuity of UE during handing over, the embodiments of the present invention put forward a method and apparatus for handing over device. The technical solution is as follows:

A method of handing over device, which comprises:

Obtaining the Multimedia Broadcast Multicast Service (MBMS) service reception information of the device;

According to the MBMS service reception information, selecting a target cell supporting the MBMS service for the device;

Handing over the device to the target cell.

An apparatus for handing over device, which comprises: an acquiring module, a selection module and a handing over module;

The acquiring module, is used to acquire MBMS service reception information of the device;

The selection module, is used to select a target cell supporting MBMS service for the device according to the MBMS service reception information;

The handing over module, is used to hand over the device to the target cell;

The beneficial effect of the technical solution provided by the embodiments of the present invention is: select a target cell supporting the MBMS service for the device according to MBMS service reception information, so as to realize the technical solution of handing over the device to the target cell, thus guaranteeing the MBMS service continuity of the device during handing over.

DETAILED DESCRIPTION OF THE EMBODIMENTS OF THE PRESENT INVENTION

To make the purpose, technical solution and advantages of the present invention to clearer, the technical solutions in the present invention are explained in a detailed way with reference to the drawings in the present invention.

Embodiment 1

Figure 2:
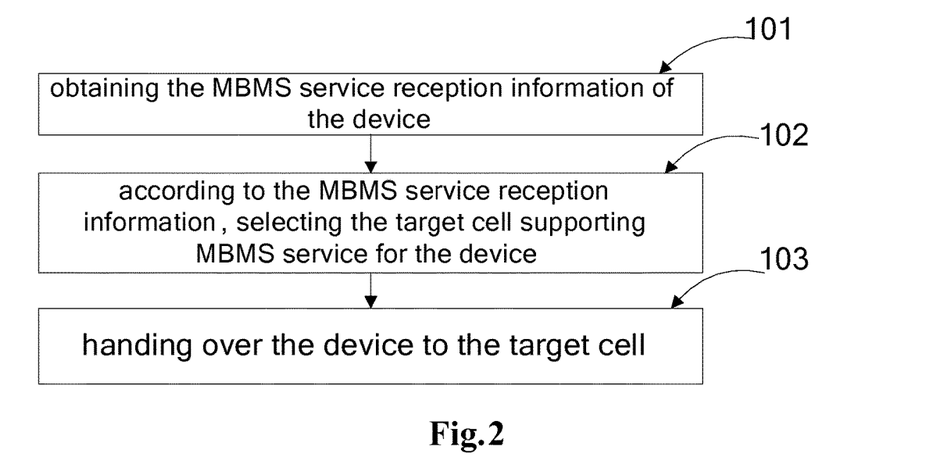
FIG. 2 is the flow diagram of the method for device handing over provided in Embodiment I of the present invention.

Refer to FIG. 2, a method of device handing over, whose implementation body includes the node in base station or network, and will not be specifically defined in the present invention, including:

Step 101: obtaining the MBMS service reception information of the device;

To be specific, the method for obtaining MBMS service reception information of the device is as follows:

1). Receive the MBMS service reception information reported by the device when it detects its MBMS service changes;

2). Receive the MBMS service reception information reported by the device when it receives the MBMS service;

3). Receive the MBMS service reception information reported by the device when it satisfies configuration report trigger conditions;

4). Send MBMS service reception information request message to the device and receive the MBMS service reception information returned by the device.

Step 102: according to the MBMS service reception information, selecting the target cell supporting MBMS service for the device;

Therein, MBMS service reception information shall at least include: MBSFN (Multicast Broadcast Single Frequency Network) area information, MBMS service information, MBMS session information and MBMS service reception indication information;

To be specific, select a cell supporting MBMS service as the target cell in accordance with MBSFN area information, MBMS service information, MBMS session information and MBMS service reception indication information as well as UE measurement report information;

Step 103: handing over the device to the target cell.

The beneficial effect of the technical solution provided by the embodiments of the present invention is: select a target cell supporting the MBMS service for the device according to MBMS service reception information, so as to realize the technical solution of handing over the device to the target cell, thus guaranteeing the MBMS service continuity of the device during handing over.

Figure 3:
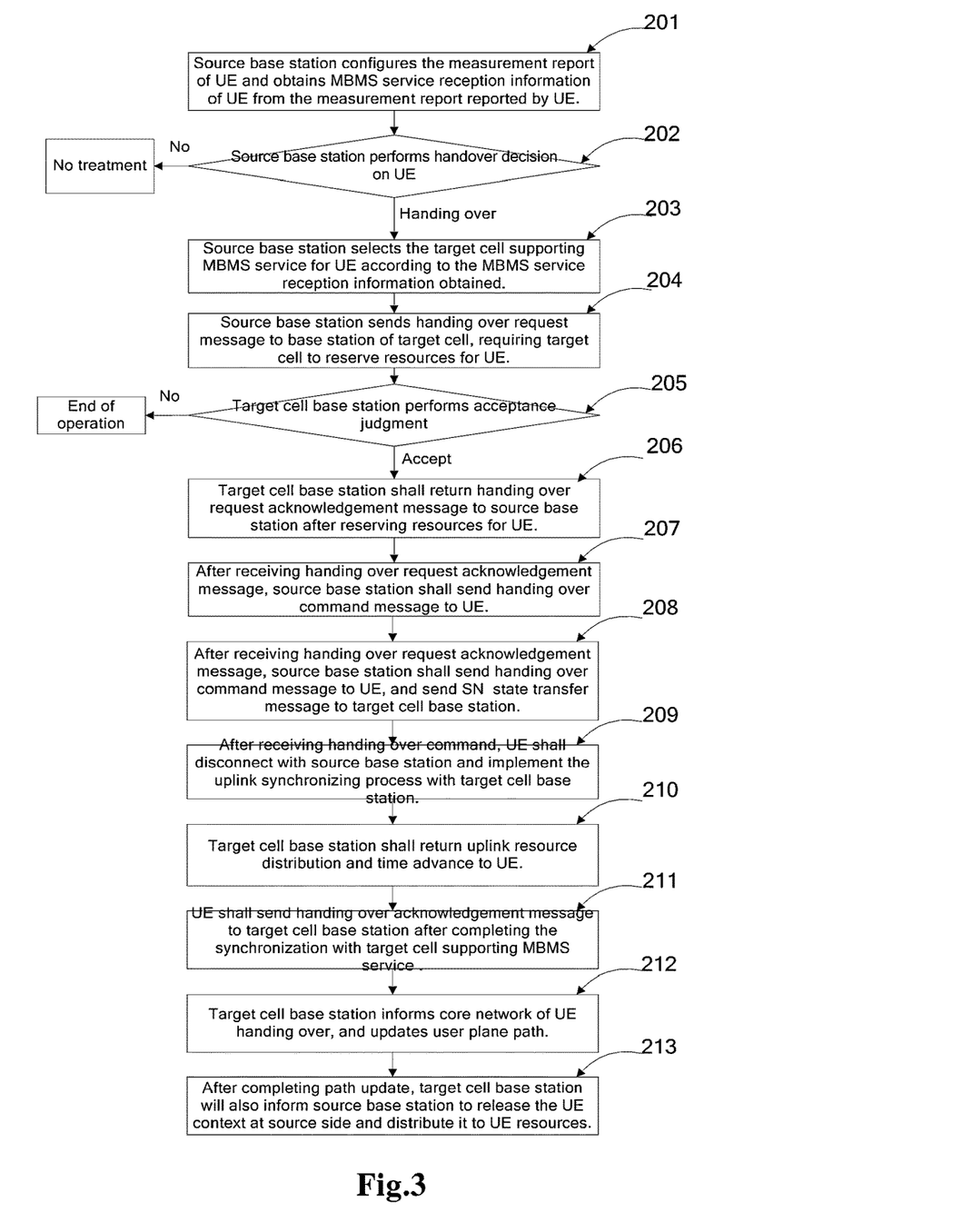
FIG. 3 is the flow diagram of the method for device handing over provided in Embodiment I of the present invention.

Next, the method of device handing over mentioned above will be introduced in a detailed way, whose implementation body includes the node in base station or network, and will not be specifically defined in the present invention. Refer to FIG. 3. The method of device handing over mentioned in the Embodiment is completed through X2 interface. The concrete steps are:

Step 201: Source base station configures the measurement report of UE and obtains MBMS service reception information of UE from the measurement report reported by UE;

To be specific, source base station configures measurement report for UE, then distributes a 1 Bit indicating bit for each measuring cell in the measurement report and sends the report to UE; UE judges whether the indicating bit in the measurement report received appears, if yes, it will send its own MBMS service reception information to source base station; or UE judges whether the indicating bit in the measurement report received is predetermined value. For example, the predetermined value is 1. If yes, it will send its own MBMS service reception information to source base station.

Therein, MBMS service reception information specifically includes MBSFN area information, MBMS service information, MBMS session information, etc.; in case of concrete realization, the MBMS service reception information can be a 4 bit indication information, indicating the ID of MBSFN cell receiving MBMS service, or a 8 bit bitmap format, indicating the MBSFN cells receiving MBMS service. For example, set the corresponding bitmap position of MBSFN cell where UE receives service or is interested in the service thereon as 1 and maintain others to be 0. It can also be a bit indication information, indicating UE is receiving MBMS service.

In addition, source base station can also obtain the MBMS service reception information of UE through the following modes:

Mode I: Source base station initiates new RRC (Radio Resource Control) message to UE, which refers to MBMS service reception information specifically; UE reports its own MBMS service reception information to source base station after receiving the MBMS service reception information.

Or

Source base station initiates UE RRC connection reconfiguration message which indicates the MBMS service reception information reported by UE; after receiving the RRC connection reconfiguration message, UE returns RRC connection reconfiguration completion message to source base station, with MBMS service reception information of its own carried.

It should be noted that, mode I should be realized under the premise of satisfying certain trigger conditions, that is, source base station learns that UE will or may hand over.

To be specific, according to the cell signal quality index covered in measurement report reported in UE, source base station considers UE will hand over and initiates RRC information to UE when the cell signal quality obtained is lower than predetermined threshold;

To be specific, UE moving records will be saved on source base station, including the resident cell and resident time of UE, and source base station can judge the moving velocity of UE based on the moving records. When moving velocity of UE exceeds the pre-set value, it is considered UE may hand over and RRC information will be initiated to UE.

Mode II: Obtain the MBMS service reception information automatically reported by UE. For example, UE will report its own MBMS service reception information to source base station once starting receiving MBMS service, or report its own MBMS service reception information when MBMS service changes.

In addition, it should be noted that, the previous step also comprises:

Step 201: Source base station obtains the handover restriction list information of UE and configures measurement report of UE based on the handover restriction list information; to be specific, according to attach or TAU (Tracking Area Update) processes, source base station obtains handover restriction list information of UE from MME (Mobility Management Entity) and saves it in UE context information of source base station, without measurement report of UE configured for limited handing over region of UE.

Step 202: Source base station judges UE handing over. If UE handing over is considered to occur according to the judgment, perform step 203, or else, no treatment is required;

To be specific, source base station can make handover decision in accordance with measurement report reported by UE and RRM (Radio Resource Management) algorithm, wherein the measurement report reported by UE includes cell signal quality index. When the cell signal quality obtained is lower than preset threshold, UE handing over is considered to occur.

Step 203: Source base station selects the target cell supporting MBMS service for UE according to the MBMS service reception information obtained, wherein MBMS service reception information includes the MBSFN area information receiving MBMS service; Correspondingly, select a MBSFN area as the target cell from the MBSFN area information receiving MBMS service.

Step 204: Source base station sends handing over request message to base station of target cell, requiring target cell to reserve resources for UE; handing over request message includes: X2 signaling connection ID, MBMS service reception information of UE, UE bearer information in source base station, RRM context, handover restriction list information, UE history information, etc.

The step also includes: source base station transfers the UE context information saved to the base station of target cell;

It should be noted that, target cell base station shall save the MBMS service reception information of UE after receiving it, so as to select the cell supporting MBMS service for UE according to the saved MBMS service reception information for the next UE handing over.

Step 205: Target cell base station performs reception judgment on UE according to the UE bearer information received. If accepting UE, implement step 206, or else, end the operation;

To be specific, target cell base station judges whether bearer connection is established between target cell base station and UE. If yes, accept UE, or else, refuse UE.

Step 206: Target cell base station shall return handing over request acknowledgement message to source base station after reserving resources for UE;

Therein, handing over request acknowledgement message includes: bearer information allowing handing over, TEID (Tunnel Endpoint Identifier) address distributed for data forwarding, information to be transmitted to UE by source base station, etc.

Step 207: After receiving handing over request acknowledgement message, source base station shall send handing over command message to UE;

Step 208: After receiving handing over request acknowledgement message, source base station shall send handing over command message to UE, and send SN (Service Node) state transfer message to target cell base station, which is used to indicate the receiving state of uplink data and sending state of downlink data in source base station for target cell base station;

Step 209: After receiving handing over command, UE shall disconnect with source base station and implement the uplink synchronizing process with target cell base station;

Step 210: Target cell base station shall return uplink resource distribution and time advance to UE;

Step 211: UE shall send handing over acknowledgement message to target cell base station after completing the synchronization with target cell supporting MBMS service;

It should be noted that, UE can continue to receive the interested MBMS service on corresponding MTCH (Multicast Traffic Channel) in target cell supporting MBMS service;

Therein, MTCH is a point-to-multipoint downlink channel, used for core network to send specific MBMS service data to UE.

Step 212: Target cell base station informs core network of UE handing over, and updates user plane path;

Step 213: After completing path update, target cell base station will also inform source base station to release the UE context at source side and distribute it to UE resources.

The beneficial effect of the technical solution provided by the embodiments of the present invention is: select a target cell supporting the MBMS service for the device according to MBMS service reception information, so as to realize the technical solution of handing over the device to the target cell, thus guaranteeing the MBMS service continuity of the device during handing over.

Figure 4:
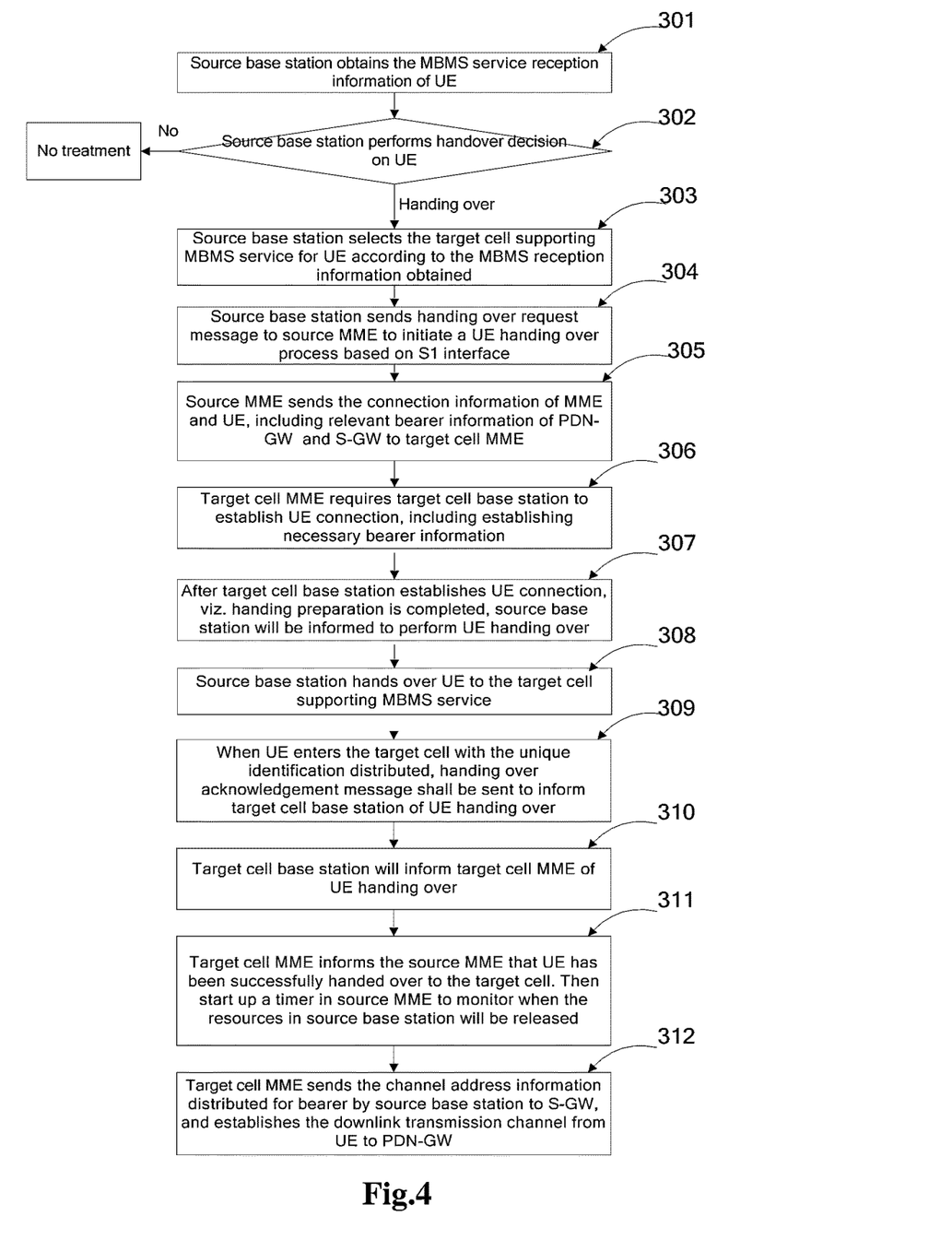
FIG. 4 is the flow diagram of the method for device handing over provided in Embodiment I of the present invention.

Next, the above method for device handing over is described in details in combination with S1 handing over process, as shown in FIG. 4, with the concrete steps as follows:

Step 301, the source base station acquires MBMS service reception information of UE;

Therein, MBMS service reception information at least includes: MBSFN area information, MBMS service information, MBMS session information and MBMS service reception indication information; in case of concrete realization, the MBMS service reception information can be a 4 bit indication information, indicating the ID of MBSFN cell receiving MBMS service, or a 8 bit bitmap format, indicating the MBSFN cells receiving MBMS service. For example, set the corresponding bitmap position of MBSFN cell where UE receives service or is interested in the service thereon as 1 and maintain others to be 0. It can also be a bit indication information, indicating UE is receiving MBMS service.

To be specific, the mode of obtaining MBMS service reception information of UE is described as below:

Mode I: Source base station configures measurement report for UE, then distributes a 1 Bit indicating bit for each measuring cell ID in the measurement report and sends the report to UE; UE judges whether the indicating bit in the measurement report received appears, if yes, it will send its own MBMS service reception information to source base station; or UE judges whether the indicating bit in the measurement report received is predetermined value. For example, the predetermined value is 1. If yes, it will send its own MBMS service reception information to source base station.

Mode II: Source base station initiates new RRC message to UE, which refers to MBMS service request information specifically; UE reports its own MBMS service reception information to source base station after receiving the MBMS service reception information.

Or

Source base station initiates RRC connection reconfiguration message which indicates the MBMS service reception information reported by UE; after receiving the RRC connection reconfiguration message, UE returns RRC connection reconfiguration completion message to source base station, with MBMS service reception information of its own carried.

It should be noted that, mode II should be realized under the premise of satisfying certain trigger conditions, that is, source base station learns that UE will or may hand over.

To be specific, according to the cell signal quality index covered in measurement report reported in UE, source base station considers UE will hand over and initiates RRC information to UE when the cell signal quality obtained is lower than predetermined threshold;

To be specific, UE moving records will be saved on source base station, including the resident cell and resident time of UE, and source base station can judge the moving velocity of UE based on the moving records. When moving velocity of UE exceeds the pre-set value, it is considered UE may hand over and RRC information will be initiated to UE.

Mode II: Obtain the MBMS service reception information automatically reported by UE. For example, UE will report its own MBMS service reception information to source base station once starting receiving MBMS service, or report its own MBMS service reception information when MBMS service changes.

Mode III: Obtain the MBMS service reception information automatically reported by UE. For example, UE will report its own MBMS service reception information to source base station once starting receiving MBMS service, or report its own MBMS service reception information when MBMS service changes.

Step 302: Source base station judges UE handing over. If UE handing over is considered to occur according to the judgment, perform step 303, or else, no treatment is required;

To be specific, source base station can make handover decision in accordance with measurement report reported by UE and RRM algorithm, wherein the measurement report reported by UE includes cell signal quality index. When the cell signal quality obtained is lower than preset threshold, UE handing over is considered to occur.

Step 303: Source base station selects the target cell supporting MBMS service for UE according to the MBMS service reception information obtained;

To be specific, MBMS service reception information at least includes: MBSFN area information, MBMS service information, MBMS session information and MBMS service reception indication information;

Correspondingly, select a cell supporting MBMS service as the target cell according to MBSFN area information, MBMS service information, MBMS session information and MBMS service reception indication information as well as the measurement report information reported by UE.

Step 304: Source base station sends handing over preparation message to source MME to initiate a UE handing over process based on S1 interface, such handing over request message includes MBMS service reception information of UE;

Step 305: Source MME sends the connection information of MME and UE stored in itself, including relevant bearer information of PDN-GW (Public Data Networks Gateway) and S-GW (Serving Gateway) to target cell MME;

It should be noted that, during S-GW relocation, target cell MME will select a target cell S-GW to establish user plane for all bearers transmitted to the target cell MME.

Step 306: Target MME requires target cell base station to establish UE connection, including establishing necessary bearer information;

To be specific, require the target cell base station to establish UE connection by sending handing over request message to it, which includes MBMS service reception information of UE; target cell base station will receive and save the MBMS service reception information, so as to select the target cell supporting MBMS service for UE according to the MBMS service reception information for the next UE handing over.

It should be noted that, when indirect forwarding is adopted, forwarding channel shall be established between target cell and target cell S-GW; besides, forwarding channel between source cell and source S-GW is also required.

Step 307: After target cell base station establishes UE connection, viz. handing preparation is completed, source base station will be informed to perform UE handing over;

It should be noted that this process also carries address parameter of data forwarding channel, to establish forwarding channel.

Step 308: Source base station hands over UE to the target cell supporting MBMS service;

It should be noted that, after handed over to the target cell, UE can continue to receive interested MBMS service on corresponding MTCH;

Therein, MTCH is a point-to-multipoint downlink channel, used for core network to send specific MBMS service data to UE.

The following steps after step 308 also include:

Step 309: When UE enters the target cell with the unique identification distributed, handing over acknowledgement message shall be sent to inform target cell base station of UE handing over;

Step 310: Target cell base station will inform target cell MME of UE handing over;

Step 311: Target cell MME informs the source MME that UE has been successfully handed over to the target cell. Then start up a timer in source MME to monitor when the resources in source base station will be released;

Step 312: Target cell MME sends the channel address information distributed for bearer by source base station to S-GW, and establishes the downlink transmission channel from UE to PDN-GW. In case of S-GW relocation, update the bearer between S-GW and PDN-GW.

It should be noted that, at any moment after step 308, UE can initiate TAU (Tracking Area Update) process to update the position information in HSS (Home Subscriber Server).

The beneficial effect of the technical solution provided by the embodiments of the present invention is: select a target cell supporting the MBMS service for the device according to MBMS service reception information, so as to realize the technical solution of handing over the device to the target cell, thus guaranteeing the MBMS service continuity of the device during handing over.

Embodiment 2

Figure 5:
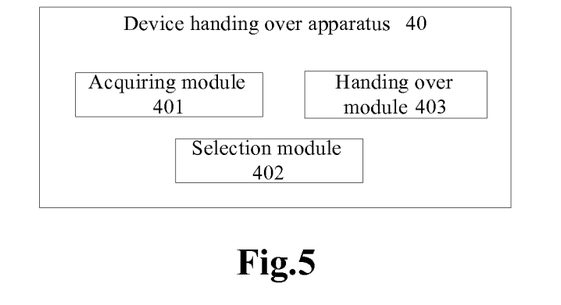
FIG. 5 is the block diagram of the apparatus for device handing over provided in Embodiment II of the present invention.

Refer to FIG. 5. The embodiment provides an apparatus 40 for handing over device, which comprises: acquiring module 401, selection module 402 and handing over module 403;

Acquiring module 401, used for obtaining the MBMS service reception information of the device;

Selection module 402, used for selecting a target cell supporting the MBMS service for the device according to the MBMS service reception information;

Handing over module 403, used for handing over the device to the target cell.

The beneficial effect of the technical solution provided by the embodiments of the present invention is: select a target cell supporting the MBMS service for the device according to MBMS service reception information, so as to realize the technical solution of handing over the device to the target cell, thus guaranteeing the MBMS service continuity of the device during handing over.

Figure 6:
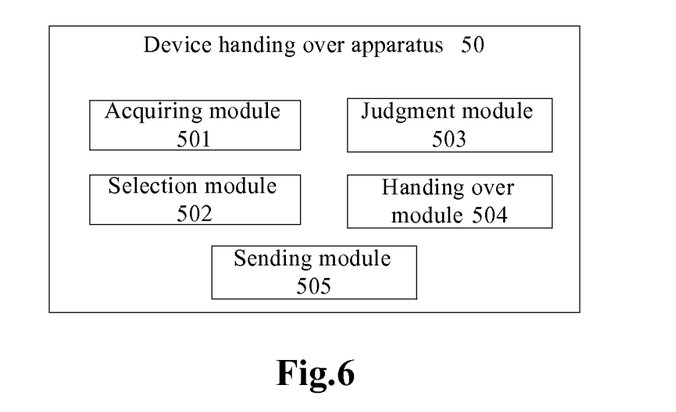
FIG. 6 is the block diagram of the apparatus for device handing over provided in Embodiment II of the present invention.

Hereinafter, the aforementioned apparatus for handing over device will be introduced in details. Refer to FIG. 6. The apparatus 50 includes: acquiring module 501, selection module 502, judgment module 503, handing over module 504 and sending module 505;

Acquiring module 501, used for obtaining MBMS service reception information of the device;

To be specific, acquiring module 501 specifically comprises:

Unit I, used for receiving the MBMS service reception information reported by the device when it detects its MBMS service changes;

Or, unit II, used for receiving the MBMS service reception information reported by the device when it receives the MBMS service;

Or, unit III, used for receiving the MBMS service reception information reported by the device when it satisfies configuration report trigger conditions;

Or, unit IV and unit V, wherein:

Unit IV, used for sending MBMS service reception information request message to the device;

Unit V, used for receiving the MBMS service reception information returned by the device.

Acquiring module 501 also includes:

Trigger unit, used for triggering unit IV to send MBMS service reception information request message to the device when it satisfies the predetermined trigger conditions that handing over will occur to the device.

Selection module 502, used for selecting the target cell supporting MBMS service for the device in accordance with the MBMS service reception information received and the measurement report information reported by UE;

Therein, the MBMS service reception information at least includes: MBSFN area information, MBMS service information, MBMS session information and MBMS service reception indication information;

Correspondingly, selection module 502 is specifically used to select a cell supporting MBMS service as the target cell according to MBSFN area information, MBMS service information, MBMS session information and MBMS service reception indication information as well as the measurement report information reported by UE.

Judgment module 503, used for handover decision;

To be specific, judgment module 503 is used to make handover decision in accordance with measurement report reported by UE and RRM algorithm, wherein the measurement report reported by UE includes cell signal quality index. When the cell signal quality obtained is lower than preset threshold, UE handing over is considered to occur.

Handing over module 504, used for handing over the device to the target cell;

To be specific, handing over module 504 is used to hand over the device to the target cell and make it continue receiving MBMS service, including:

The first handing over unit, used for handing over the device to target cell through the first handing over interface which refers to X2 interface of LTE system;

Or, the second handing over unit, used for handing over the device to target cell through the second handing over interface which refers to S1 interface of LTE system.

Sending module 505, used for sending the MBMS service reception information to the target cell base station for saving during handing over, so that the target cell base station can select the target cell supporting MBMS service for the device in accordance with MBMS service reception information the next time.

Device 50 mentioned in the embodiment also comprises:

Configuration module 506, used for configuring measurement report of device;

Receiving module 507, used for receiving the measurement report reported by the device.

The beneficial effect of the technical solution provided by the embodiments of the present invention is: select a target cell supporting the MBMS service for the device according to MBMS service reception information, so as to realize the technical solution of handing over the device to the target cell, thus guaranteeing the MBMS service continuity of the device during handing over.

All or part contents in technical solutions provided by the above embodiments can be realized by software programming, with the software program stored in readable storage medium, such as hard disk, optical disk or floppy disk in computer.

The descriptions above are just preferred embodiments of the present invention. It should be pointed that any modification, equal substitution, improvements, etc. within the spirit and principle of the present invention should be as the protection scope of the present invention.

The invention claimed is:

1. A method comprising:
   obtaining, by a processor of a base station or network node, MBMS (Multimedia Broadcast/Multicast Service) reception information of a device, the obtaining of the MBMS reception information including: (i) receiving MBMS service reception information reported by the device when the device detects MBMS service changes, (ii) receiving MBMS service reception information reported by the device when the device receives MBMS service; (iii) receiving MBMS service reception information reported by the device when the device satisfies a configuration report trigger condition, or (iv) sending an MBMS service reception information request message to the device and receiving the MBMS service reception information returned by the device in response to the request message, wherein the MBMS reception information is 4-bit indication information indicating an identifier (ID) of an MBSFN cell receiving MBMS service, or an 8-bit bitmap format indicating MBSFN cells receiving MBMS service;
   selecting, by the processor of the base station or network node, a handover target cell supporting MBMS service for the device according to the MBMS service reception information; and
   handing over, by the processor of the base station or network node, the device to the target cell.

2. The method according to claim 1, wherein
   the MBMS service reception information includes at least one of: MBSFN (Multimedia Broadcast Single Frequency Network) area information, MBMS service information, MBMS session information, and MBMS service reception indication information, and
   the selecting of the handover target cell includes selecting a cell supporting MBMS service as the handover target cell based on the at least one of: the MBSFN area information, the MBMS service information, the MBMS session information and the MBMS service reception indication information.

3. The method according to claim 1, further comprising:
   sending, by the processor of the base station or network node, the MBMS service reception information to a target cell base station for saving when the device is handed over to the target cell, so that the target cell base station can select the target cell supporting MBMS service for the device in accordance with the MBMS service reception information for the next handing over.

4. The method according to claim 1, wherein
   the base station or network node hands over the device to the target cell based on an X2 interface including the base station or network node sending a handing over request message to the target cell base station and requiring the target cell base station to reserve resources for the device, and
   the handing over request message comprises the MBMS service reception information of the device.

5. The method of claim 1, wherein
   the base station or network node hands over the device to the target cell based on an S1 interface including the base station or network node sending a handing over preparation message to a source MME (Mobility Management Entity),
   the method further comprises: a target cell MME sending the handing over request message to the target cell base station, and
   the handing over request message includes device MBMS service reception information.

6. The method of claim 1, wherein the MBMS reception information is the 8-bit bitmap format.

7. The method of claim 1, wherein the MBMS reception information is the 8-bit bitmap format, which has been set so that a corresponding bitmap position of the MBSFN receiving cell where user equipment (UE) receives service or is interested in the service thereon as a different value than other bitmap positions.

8. The method of claim 1, wherein the MBMS reception information is the 8-bit bitmap format, which has been set so that a corresponding bitmap position of the MBSFN receiving cell where user equipment (UE) receives service or is interested in the service thereon as 1 and maintain others to be 0.

9. The method of claim 1, further comprising: starting up of a timer in a source MME (Mobility Management Entity) to monitor when the resources in a source base station will be released.

10. The method of claim 1, further comprising:
a source base station configuring a measurement report for user equipment (UE), then distributing a 1 Bit indicating bit for each measuring cell ID in the measurement report and sending the report to the UE.

11. The method of claim 10, further comprising:
judging, by the UE, whether the 1 Bit indicating bit appears in the measurement report; and
if the 1 Bit indicating bit appears in the measurement report or the 1 Bit indicating bit is determined to be a predetermined value, sending, by the UE, its own MBMS service reception information to the source base station.

12. An apparatus comprising:
a memory; and
a processor of a base station or network node configured to:
   obtain MBMS (Multimedia Broadcast/Multicast Service) reception information of a device, the obtaining of the MBMS reception information including: (i) receiving MBMS service reception information reported by the device when the device detects MBMS service changes, (ii) receiving MBMS service reception information reported by the device when the device receives MBMS service; (iii) receiving MBMS service reception information reported by the device when the device satisfies a configuration report trigger condition, or (iv) sending an MBMS service reception information request message to the device and receiving the MBMS service reception information returned by the device in response to the request message, wherein the MBMS reception information is 4-bit indication information indicating an identifier (ID) of an MBSFN cell receiving MBMS service, or an 8-bit bitmap format indicating MBSFN cells receiving MBMS service;
   select a handover target cell supporting MBMS service for the device according to the MBMS service reception information; and
   hand over the device to the handover target cell.

13. The apparatus according to claim 12, wherein
the MBMS service reception information comprises: MBSFN area information, MBMS service information, MBMS session information and MBMS service reception indication information, and
the processor of the base station or network nodes selects a cell supporting MBMS service as the handover target cell in accordance with the MBSFN area information, MBMS service information, MBMS session information and MBMS service reception indication information.

14. The apparatus according to claim 13, wherein the processor of the base station or network node is configured to:
send the MBMS service reception information to the target cell base station for saving during handing over, so that the target cell base station can select the target cell supporting MBMS service for the device according to the MBMS service reception information during the next selection.

* * * * *